United States Patent [19]

Hulse et al.

[11] Patent Number: 5,645,777
[45] Date of Patent: Jul. 8, 1997

[54] DISPENSING APPARATUS

[75] Inventors: David Kenneth Hulse; William Colin Barnett, both of Stoke-on-Trent, England

[73] Assignee: Royal Doulton (UK) Limited, Stoke-on-Trent, England

[21] Appl. No.: 396,688

[22] Filed: Mar. 1, 1995

[30] Foreign Application Priority Data

Mar. 4, 1994 [GB] United Kingdom ............... 9404161

[51] Int. Cl.$^6$ ................................................. B29C 31/00
[52] U.S. Cl. .................... 264/40.4; 425/147; 425/259; 425/261
[58] Field of Search ........................... 425/259, 145, 425/147, 447, 261; 264/40.4

[56] References Cited

U.S. PATENT DOCUMENTS 4,035,128  7/1977  Drostholm et al. ................ 425/259

FOREIGN PATENT DOCUMENTS 575576   3/1945  United Kingdom.
628888   4/1947  United Kingdom.
1332725  1/1971  United Kingdom.

OTHER PUBLICATIONS

Search Report, GB 9504198.4, May 9, 1995.

Primary Examiner—C. Scott Bushey
Attorney, Agent, or Firm—Watts, Hoffmann, Fisher & Heinke Co., L.P.A.

[57] ABSTRACT

Apparatus for dispensing predetermined quantities of particulate material is disclosed which includes a casing defining a dispensing chamber and an inlet tube for delivering material to the chamber. The inlet tube extends into and is surrounded by the chamber. The chamber has an outlet for discharging material from the chamber. A mechanism is provided for effecting relative movement between the tube and the casing whereby to vary the volume of material introduced into the chamber on opening of an inlet valve.

7 Claims, 1 Drawing Sheet

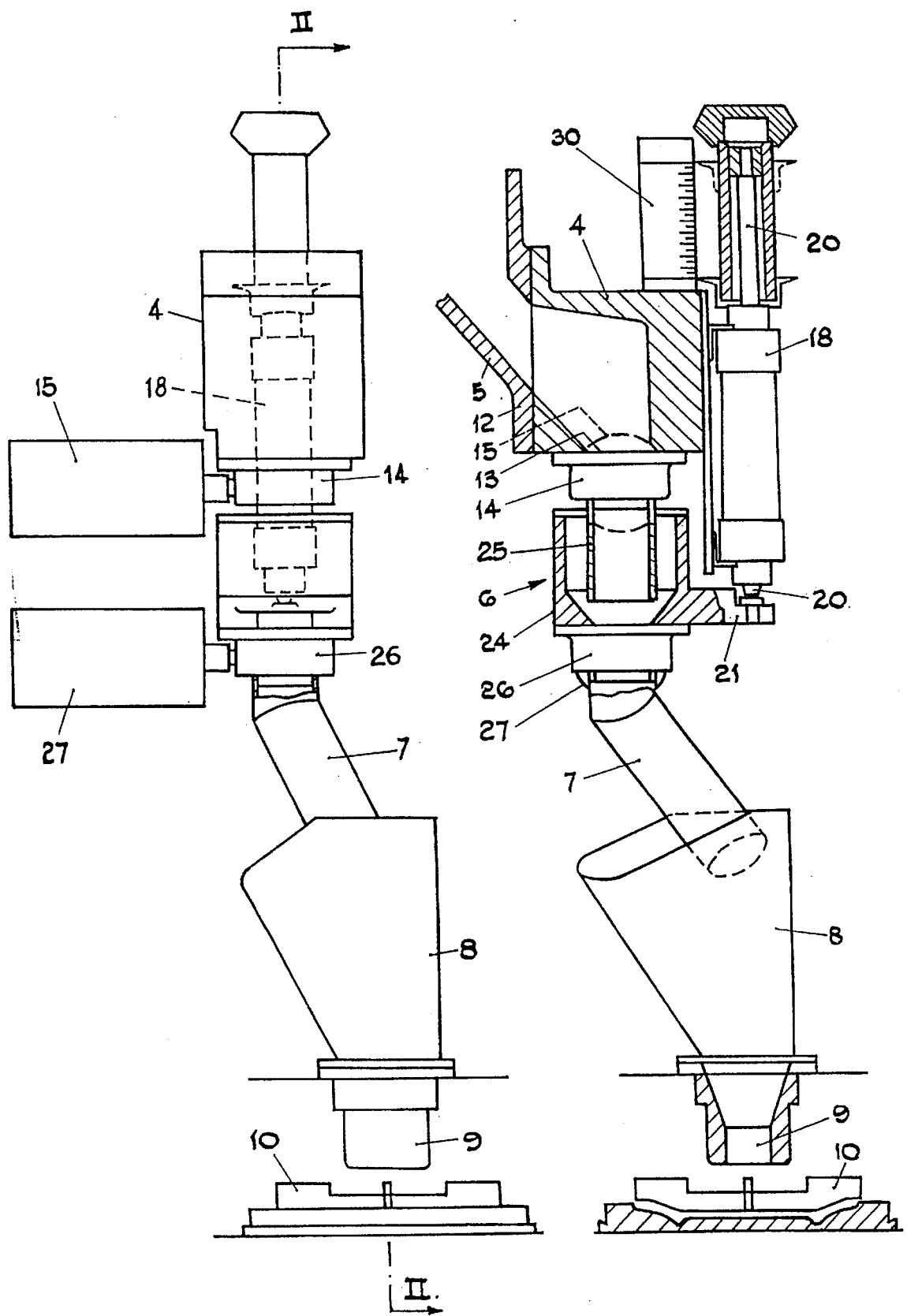

5,645,777

DISPENSING APPARATUS

FIELD OF THE INVENTION

This invention relates to dispensing apparatus especially, but not exclusively, for use in dispensing granular or other particulate material to a press or like machine.

BACKGROUND OF THE INVENTION

In the production of ceramic articles such as plates by pressing, granular or powdered ceramic materials are introduced into a mould in predetermined quantities and subjected to pressure whereby to form a pressed ceramic article. The quantity of material supplied to the mould at each operation is carefully controlled and modern machines of this kind incorporate a plurality of moulds supplied with material in turn and operate at high production rates, typically in the region of six hundred plates per hour.

Where it is required to alter the size of plate being produced by the machine, the mould requires to be replaced by a mould of greater or lesser volume dependent on the new plate size and in addition it is necessary to modify the dispensing unit of the machine so as to deliver a different quantity or ceramic material to the mould. Hitherto this has been a relatively time consuming and complex operation resulting in many cases in a down time of around forty Five minutes and hence a loss or production of, typically, around flour hundred and fifty plates. It is an object of the present invention to obviate or mitigate this disadvantage.

SUMMARY OF THE INVENTION

The invention provides apparatus for dispensing predetermined quantities of particulate material comprising a dispensing chamber, inlet means for delivering material to said chamber, said inlet means extending into and being surrounded by said chamber, means for discharging material from said chamber, and means for effecting relative movement between said inlet means and said chamber whereby to vary the volume of material introduced into the chamber on opening of said inlet means.

Preferably said inlet means includes a tubular member projecting downwardly into said chamber from its upper end and vertically movable relative to the chamber to vary the distance between the lower end of said tubular member and the bottom of said chamber.

Preferably the apparatus includes inlet and outlet valve members respectively associated with said inlet means and said means for discharging material from said chamber, means being provided for bodily moving one of said valve members and associated components of the apparatus relative to the other, whereby to effect relative movement of said inlet means and said chamber.

The invention also provides a method of dispensing a variable volume of material comprising providing a dispensing chamber having inlet means extending vertically into and surrounded by said chamber, effecting relative vertical movement between said inlet means and said chamber to vary the distance between the lower end of said inlet means and the bottom of said chamber, introducing material into said chamber through said inlet means, closing said inlet means and opening discharge means to discharge the material From the chamber.

BRIEF DESCRIPTION OF THE DRAWINGS

An embodiment of the invention will now be described, by way of example only, with reference to the accompanying drawings, in which:

FIG. 1 is a side elevation of one form of dispensing apparatus according to the invention; and FIG. 2 is a vertical cross-section through the device, generally on the line II—II in FIG. 1.

DESCRIPTION OF THE PREFERRED EMBODIMENTS

Referring to the drawings, the dispensing unit is adapted to be mounted on a press for producing ceramic plates by pressing granular or powdered ceramic material and includes a casing 4 adapted to be mounted on a feed hopper 5 of the press, a dispensing assembly 6 and an outlet pipe 7 extending into a hopper 8 adapted to deliver the ceramic material through an outlet 9 to a mould 10 forming part of the plate press. Generally the press will incorporate a plurality of such moulds adapted to be brought into position beneath the outlet 9 in turn during operation of the press.

The casing 4 defines a feed chamber 12 into which ceramic material gravitates from the main hopper 5. The chamber 12 has an outlet 13 below which is mounted a valve housing 14 incorporating a butterfly valve (not shown) which may be rotated from a horizontal closed position to a tilted open position by means of a compressed air-operated actuator 15 best seen in FIG. 2.

Also mounted on the casing 4 is a through-rod pneumatic cylinder 18 the lower end of which is connected through a control valve (not shown) to a source of air under pressure. A piston rod 20 is slidably mounted in the cylinder 18 and projects from its lower end where it is connected to a bracket 21 on which components of the dispensing assembly 6 are mounted.

The dispensing assembly comprises an outer casing 24 defining a dispensing chamber and an inner tubular member 25 through which material enters the chamber. The lower end of the tube 25 defines an outlet opening communicating with the interior of the chamber 24. A valve housing 26 is mounted beneath the chamber 24 and incorporates a butterfly valve (not shown) which may be rotated by a compressed air-operated actuator 27 between a generally horizontal closed position in which discharge of material From the chamber 24 is prevented, and a tilted open position in which the outlet From the chamber 24 communicates with the outlet pipe 7.

In operation of the device the inlet valve 14 is initially maintained in an open position to permit communication between the feed chamber 12 and the tube 25 while the valve 26 is maintained in a closed position. In this position material from the chamber 12 passes through the tube 25 into the chamber 24 until the level in chamber 24 reaches the bottom of the tube 25, at which point delivery ceases. To deliver the ceramic material to the mould 10, valve 14 is first closed and valve 26 then opened to discharge the contents of the chamber 24 and the tube 25 through the pipe 7 and hopper 8 into the mould 10. Thereafter the valve 26 is closed and valve 14 opened to permit further delivery of material from the chamber 12 into the tube 25 and chamber 24 ready for subsequent delivery. This sequence of operations continues so long as the machine is employed to produce plates of the same size which require the same predetermined volume of ceramic material.

If it is desired to adapt the machine to produce plates of different size, the mould 10 is removed and replaced by a larger or smaller mould dependent on the size of the new plates to be produced. The volume of ceramic material to be delivered at each operation of the dispensing unit then requires to be altered as follows. Cylinder 18 is actuated to move the bracket 21, and hence the dispensing chamber assembly 24, valve 26 and outlet 7, upwardly or downwardly relative to the support bracket 5 and valve 14. The chamber 24 is thus moved relative to the tube 25 to vary the distance between the bottom of the tube and the bottom of the chamber. This alters the volume of ceramic material which enters the chamber 24 when the valve 14 is opened since the chamber fills to the level of the bottom of the tube 25 which is now spaced a different distance from the bottom of the chamber 24. The assembly is thus ready to deliver an altered volume of ceramic material to the mould at each operation by opening and closing of the valves 14 and 26 as described previously.

The volume of ceramic material required to produce a plate of a given size will be predetermined and the adjustment necessary to the cylinder 18 can be ascertained by inspection of a volume scale 30 positioned adjacent the upper end of the cylinder. The operator may thus readily effect the appropriate adjustment dependent on plate size and material volume required and the entire operation may be carried out quickly and easily with minimum disruption to running time and hence loss of plate production.

Various modifications may be made without departing From the invention. For example the construction of the dispensing chamber may be varied provided there is means to move the chamber and the inlet tube relative to one another. Different types of valve may also be employed and the means for effecting relative movement may be modified if desired.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A process for the manufacture of pressed ceramic articles comprising:
   a) adjusting the relative positions of a casing and a vertically disposed tube extending into a chamber defined by the casing;
   b) closing an outlet valve for controlling flow through a chamber outer;
   c) opening an inlet valve for controlling flow through a tube inlet;
   d) flowing a quantity of ceramic material through the tube into the chamber until the level of material in the chamber reaches a tube outlet thereby terminating flow into the chamber;
   e) following step (d) continuing the flow of material until the tube is filled with material to provide a predetermined quantity of material in the chamber and tube, the predetermined quantity being controlled by the adjusted relative positions of the dispensing member and the tube;
   f) closing the inlet valve;
   g) opening the outlet valve to deposit such predetermined quantity in a mold;
   h) repeating steps (b) through (g) for a desired number of cycles;
   i) following step (g) of each cycle compressing the material in the mold to form a pressed ceramic article and removing the formed article from the mold;
   j) after the desired number of cycles has been completed replacing the mold with another mold and adjusting the relative positions of the tube and casing to provide a new predetermined quantity of material during each cycle appropriate for filling said another mold; and,
   k) thereafter repeating steps (b) through (I) for another desired number of cycles.

2. Apparatus for dispensing predetermined quantities of particulate material comprising:
   a) a closed dispensing member having walls defining a chamber;
   b) a tubular inlet member projecting downwardly into said chamber from an upper end of the dispensing member, the inlet member being spaced from the walls of said chamber;
   c) the dispensing member also having an outlet for discharging material from said chamber;
   d) an inlet valve associated with and rigidly connected to said inlet member;
   e) an outlet valve associated with and rigidly connected to said dispensing member;
   f) control means operable to open and close said valves independently and in sequence to repeatedly and sequentially deliver material to and discharge material from said chamber; and,
   g) means for effecting relative bodily movement between said inlet member and inlet valve on the one hand and said chamber and outlet valve on the other hand, whereby to alter the distance between the lower end of said inlet member and inlet valve together on the one hand and the bottom of said chamber and the outlet valve together on the other hand to thereby vary the volume of material introduced into and delivered from the chamber on operation of the respective valves.

3. Apparatus according to claim 2 wherein said inlet valve and said inlet member are fixed and said outlet valve and said dispensing member are vertically movable as a unit relative to the inlet member and the inlet valve.

4. Apparatus according to claim 3 wherein said means for effecting said relative movement comprises a pneumatic cylinder connected to said movable components.

5. Apparatus for producing moulded articles from particulate material including a mould, dispensing apparatus according to claim 2 for delivering predetermined quantities of particulate material to the mould, and means for subjecting the mould to pressure whereby to produce a pressed article therein.

6. Apparatus according to claim 5 including a plurality of moulds adapted to be moved into position beneath the dispensing apparatus in turn.

7. Apparatus according to claim 5 for producing pressed ceramic articles in which said material is granular or powdered ceramic material.

* * * * *